United States Patent
Krahnstoever et al.

(10) Patent No.: US 9,865,303 B1
(45) Date of Patent: Jan. 9, 2018

(54) CREATION OF MEDIA CLIPS FROM MEDIA BROADCASTS

(71) Applicant: Google Inc., Mountain View, CA (US)

(72) Inventors: Nils Oliver Krahnstoever, Brookline, MA (US); Pawel Jurczyk, Newton, MA (US)

(73) Assignee: GOOGLE INC., Mountain View, CA (US)

( * ) Notice: Subject to any disclaimer, the term of this patent is extended or adjusted under 35 U.S.C. 154(b) by 38 days.

(21) Appl. No.: 14/629,285

(22) Filed: Feb. 23, 2015

Related U.S. Application Data

(60) Provisional application No. 61/944,032, filed on Feb. 24, 2014, provisional application No. 62/108,414, filed on Jan. 27, 2015.

(51) Int. Cl.
| | |
|---|---|
| *H04N 9/80* | (2006.01) |
| *G11B 27/034* | (2006.01) |
| *H04L 29/06* | (2006.01) |
| *H04N 5/76* | (2006.01) |

(52) U.S. Cl.
CPC .......... *G11B 27/034* (2013.01); *H04L 65/60* (2013.01); *H04N 5/7605* (2013.01)

(58) Field of Classification Search
CPC .......... G11B 27/105; G11B 2220/2562; G11B 27/329; G11B 27/034; H04N 5/85; H04N 9/8042
USPC .................................. 386/240, 241
See application file for complete search history.

(56) References Cited

U.S. PATENT DOCUMENTS

| | | | | |
|---|---|---|---|---|
| 7,017,120 | B2 * | 3/2006 | Shnier | G06F 17/30017 700/94 |
| 7,055,166 | B1 * | 5/2006 | Logan | H04H 20/14 715/719 |
| 2006/0090186 | A1 * | 4/2006 | Santangelo | H04N 7/17336 725/87 |
| 2009/0049118 | A1 * | 2/2009 | Stevens | G06F 17/30017 709/203 |
| 2013/0108237 | A1 * | 5/2013 | Zhang | H04N 21/47211 386/230 |
| 2013/0247111 | A1 * | 9/2013 | Templeman | H04N 5/782 725/55 |
| 2013/0272374 | A1 * | 10/2013 | Eswaran | H04L 65/602 375/240.02 |

* cited by examiner

*Primary Examiner* — William Tran
(74) *Attorney, Agent, or Firm* — Young Basile Hanlon & MacFarlane, P.C.

(57) ABSTRACT

A media sharing system receives a media stream from a broadcaster system. The media sharing system streams a transcoded version of the media stream to user devices that request the media stream broadcast. Additionally, as the media stream is received from the broadcaster system, the media sharing system generates media segments that include the content of the media stream. Based on programming information received for the media stream, the media sharing system creates a media clip for each program included in the media stream. The media sharing system uses content from the media segments to generate the media clips. Further, as a user is viewing a media stream broadcast to the user's device by the media sharing system, the user may request the creation of a media clip from the media stream. The system identifies media segments that include content of the desired media clip and creates the media clip.

16 Claims, 8 Drawing Sheets

CREATION OF MEDIA CLIPS FROM MEDIA BROADCASTS

CROSS-REFERENCE TO RELATED APPLICATION

This application claims the benefit of U.S. Provisional Application No. 61/944,032, filed Feb. 24, 2014. This application also claims the benefit of U.S. Provisional Application No. 62/108,414, filed Jan. 27, 2015. Both provisional applications are hereby incorporated herein by reference.

BACKGROUND

Field of the Embodiments

Described embodiments pertain in general to media sharing, and in particular to the creation of media clips from media broadcasts.

Description of the Related Art

Media is broadcast to people on a daily basis. Popular examples of this include television programming, radio content, podcasts, and netcasts. The programming of media broadcasts is typically broadcast according to a set schedule. For example, if a user wishes to watch a specific television show, the user must watch the broadcast at a time scheduled for the show. If the user is unavailable during the show's scheduled time, the user may not get another chance to view the show. Therefore, as a result of the nature of media broadcasts, people continuously miss out on opportunities to enjoy programming that they are interested in and media broadcasters miss out on higher ratings.

SUMMARY

The embodiments described herein provide methods, computer program products, and systems for creating media clips. In one embodiment, a media sharing system receives a media stream from a broadcaster system. The media sharing system streams a transcoded version of the media stream to user devices that request the media stream broadcast. Additionally, as the media stream is received from the broadcaster system, the media sharing system generates media segments that include the content of the media stream that has not been transcoded. Each media segment is associated with at least one time of day, referred to as a wall time. Media clips are created from the non-transcoded media segments and not from the transcoded stream so that created media clips are of a high quality.

In one embodiment, the media sharing system creates a media clip for each program included in the media stream. The media sharing system receives programming information that indicates each program included in the media stream and the start and end time of each program. The media sharing system creates a media clip for a program by identifying media segments that include content of the program. The system identifies the program media segments based on the program start and end times included in the programming information. The media sharing system creates a media clip for the program using content from the identified media segments. The media clip is stored by the media sharing system and made available for access by users.

As a user is viewing a media stream broadcast to the user's device by the media sharing system, the user may request that a specific media clip be created from the media stream. The user selects a clip start time and a clip end time for the media clip. The clip start time indicates how far into the media stream the media clip is to start (e.g., the media clip should start with content one hour into the media stream). The clip end time indicates how far into the media stream the media clip is to end (e.g., the media clip should end with content two hours into the media stream). The media segments used to create media clips are associated with wall times (e.g., the time of day at which the segments were broadcast). Hence, the media sharing system maps the clip start time to a wall start time and the clip end time to a wall end time. The media sharing system identifies media segments that include content within the wall start and end times. The media sharing system creates the requested media clip using content from the identified media segments. The media clip is stored by the media sharing system and made available to the user for access.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
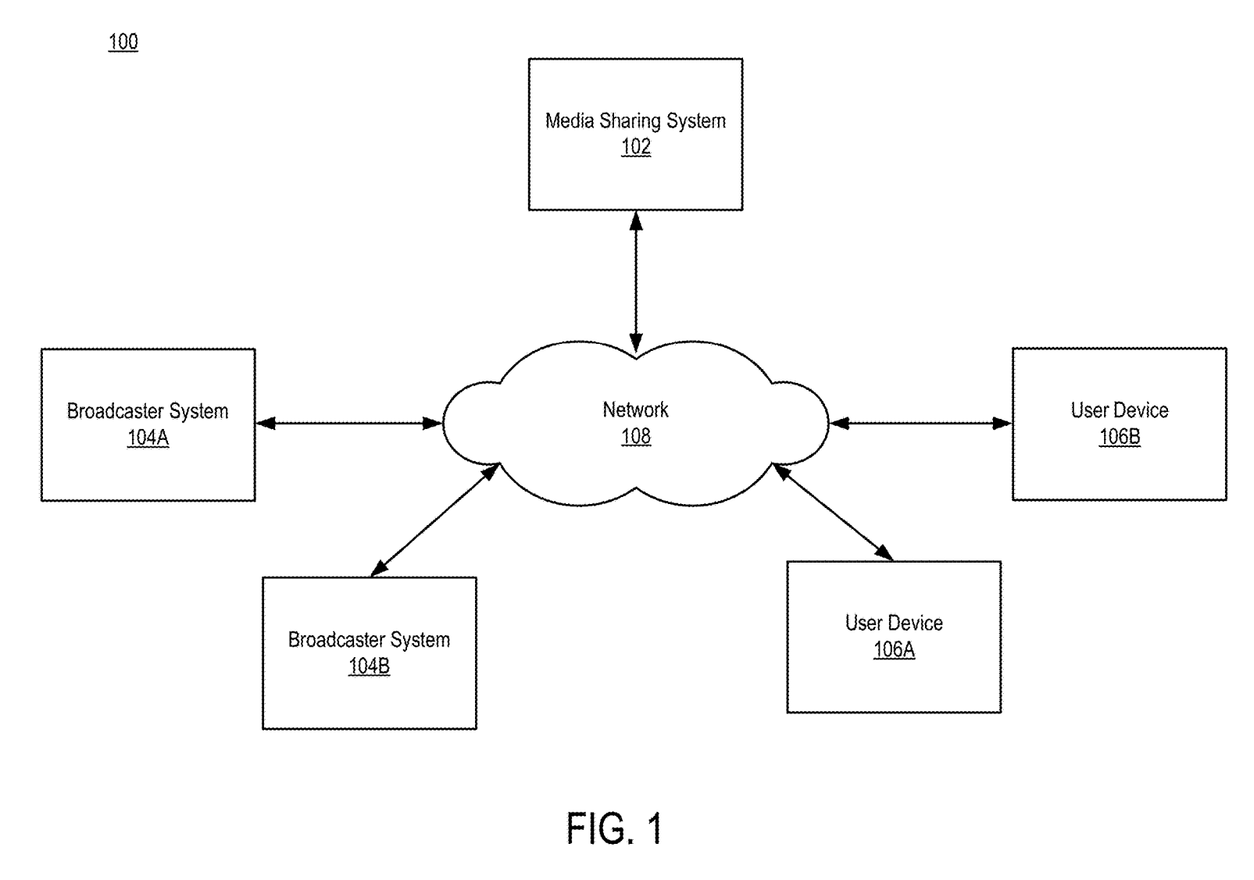
FIG. 1 is a block diagram of a media sharing environment according to one embodiment.

FIG. 1 is a block diagram of a media sharing environment 100 according to one embodiment. FIG. 1 illustrates a media sharing system 102, broadcaster systems 104A and 104B, and user devices 106A and 106B connected via a network 108. Although a select number of each entity are shown in FIG. 1, embodiments can have more or less of each entity (e.g., additional broadcaster systems 104 and user devices 106).

FIG. 1 and the other figures use like reference numerals to identify like elements. A letter after a reference numeral, such as "106A," indicates that the text refers specifically to the element having that particular reference numeral. A reference numeral in the text without a following letter, such as "106," refers to any or all of the elements in the figures bearing that reference numeral.

The media sharing system 102 is a computer system that shares media with users. The media sharing system 102 receives media streams from broadcaster systems 104 and shares a received media stream with users that request the broadcast of the stream (e.g., users that have subscribed to the stream). A media stream is a feed of media content, such as a live feed of video, audio content, and/or text. To share a media stream received from a broadcaster system 104, the media sharing system 102 transcodes the media stream into multiple transcoded chunks and streams the transcoded chunks to user devices 106 that request the media stream.

As part of sharing a media stream, the media sharing system 102 also creates media clips from the media stream. A media clip is a portion of a media stream that is made available for access by users (e.g., made available for on-demand access). A media clip has a length that is less than the total length of the media stream. The length of a media clip may refer, for example, to its size or duration.

To be able to create media clips from a media stream, the media sharing system 102 creates media segments from the media stream that is being received from a broadcaster system 104. For example, the media sharing system 102 may create 5 megabyte segments of the media stream. The media sharing system 102 stores the media segments for creating media clips from the media stream. In various embodiments, the stored media segments are created from the media stream prior to transcoding, so as to preserve a high quality.

In one embodiment, the media sharing system 102 automatically creates media clips for media streams based on programming information. For a media stream, the media sharing system 102 receives programming information associated with the media stream. The programming information may be received, for example, from the broadcaster system 104 that provided the media stream. The programming information indicates, for example, different programs included in the media stream and the start and the end time of each program.

In one embodiment, the media sharing system 102 creates a media clip for each program included in the media stream as identified by the programming information. A program is a collection of content, such as a television show, a radio show, a recording of an event, etc. To create a media clip for a program, the media sharing system 102 identifies stored media segments that include content of the program. The media sharing system 102 identifies the appropriate media segments based on a program start time and end time included in the programming information for the program. The media sharing system 102 creates the media clip from the content of the identified media segments. The media sharing system 102 stores the media clip and provides it to user devices 106 that request the media clip. Creating media clips based on programming information is convenient in that if a user misses a program when it is broadcast, the user can still enjoy the program when he is free by requesting the media clip created for the program from media sharing system 102. Additionally, a user does not have to remember to set the system 102 to create a media clip for a program since media clips are automatically created for programs.

The media sharing system 102 also creates media clips according to user requests. As a user is enjoying a media stream provided by the media sharing system 102, the user can request that a specific media clip be created. As an example, assume a user is watching a live media stream of a sporting event. If a spectacular play occurs, the user can request that a media clip be created for the play. As part of a user requesting that a media clip be created from a media stream, the user indicates a clip start time and a clip end time for the media clip on a media player through which the media stream is being presented to the user.

The media sharing system 102 receives from the user's device 106 information associated with the clip start time and the clip end time. For the clip start time, the information received includes an identifier of the media stream chunk presented by the media player at the start time and an offset. The offset indicates a position of the clip start time within the chunk. The offset is the difference between the clip start time and a playback time of the chunk. The playback time of a chunk indicates how far into the media stream the chunk starts being presented by a media player. As an example, assume the clip start time is 9 minutes and 2 seconds and at that time a chunk is presented with a playback time of 9 minutes. In this example, the offset is 2 seconds. Similar to the clip start time, the information received for the clip end time includes an identifier of the media stream chunk presented at the clip end time and an offset (difference between clip end time and a playback time of the chunk) that indicates the position of the clip end time within the chunk.

Based on the information received from the user's user device 106, the media sharing system 102 identifies stored media segments that include content that the user desires in the media clip. From the identified media segments, the media sharing system 102 creates the media clip requested by the user. The media sharing system 102 stores the media clip and allows the user to access the created media clip.

A broadcaster system 104 is a computer system that provides one or more media streams to the media sharing system 102. A broadcaster system 104 may generate a live feed of media content and transmit the live feed to the media sharing system 102 as a media stream. A broadcaster system 104 may be operated, for example, by a television network, a radio station, an individual user that generates media content (e.g., using a video recorder), or any other entity that generates content. Instead of a broadcaster system 104 generating the media streams provided to the media sharing system 102, a broadcaster system 104 may receive a media stream from another system and forward the stream to the media sharing system 102 for broadcasting.

In one embodiment, for a media stream transmitted by a broadcaster system 104 to the media sharing system 102, the broadcaster system 104 also transmits to the media sharing system 102 programming information associated with the media stream. Programming information of a media stream may include one or more of the following: an identifier of each program included in the media stream, a description/summary of each program, time of day when the broadcast of a program starts (program start time), time of day when the broadcast of a program ends (program end time), a duration of each program, and a rating of each program.

A user device 106 is a device used by a user to request content from the media sharing system 102. A user device 106 may be, for example, a personal computer, smart phone, tablet computer, personal digital assistant (PDA), or a set-top box. Through a user device 106 a user may request from the media sharing system 102 media streams being broadcast by the system 102. A user may request a media stream, for example, by subscribing to the media stream, accessing a location/channel through which stream is shared, and/or through an interface provided by the media sharing system 102.

A user device 106 receives a requested media stream in chunks. For each chunk, the user device 106 receives an identifier of the chunk and a playback time of the chunk. A media player of the user device 106 presents the chunks according to their playback times.

Through the user device 106, the user can request to create a media clip from the media stream. In one embodiment, the user selects a clip start time and a clip end time through the media player. The clip start time indicates how far into the media stream the media clip is to start. The clip end time indicates how far into the media stream the media clip is to end.

Figure 6A:
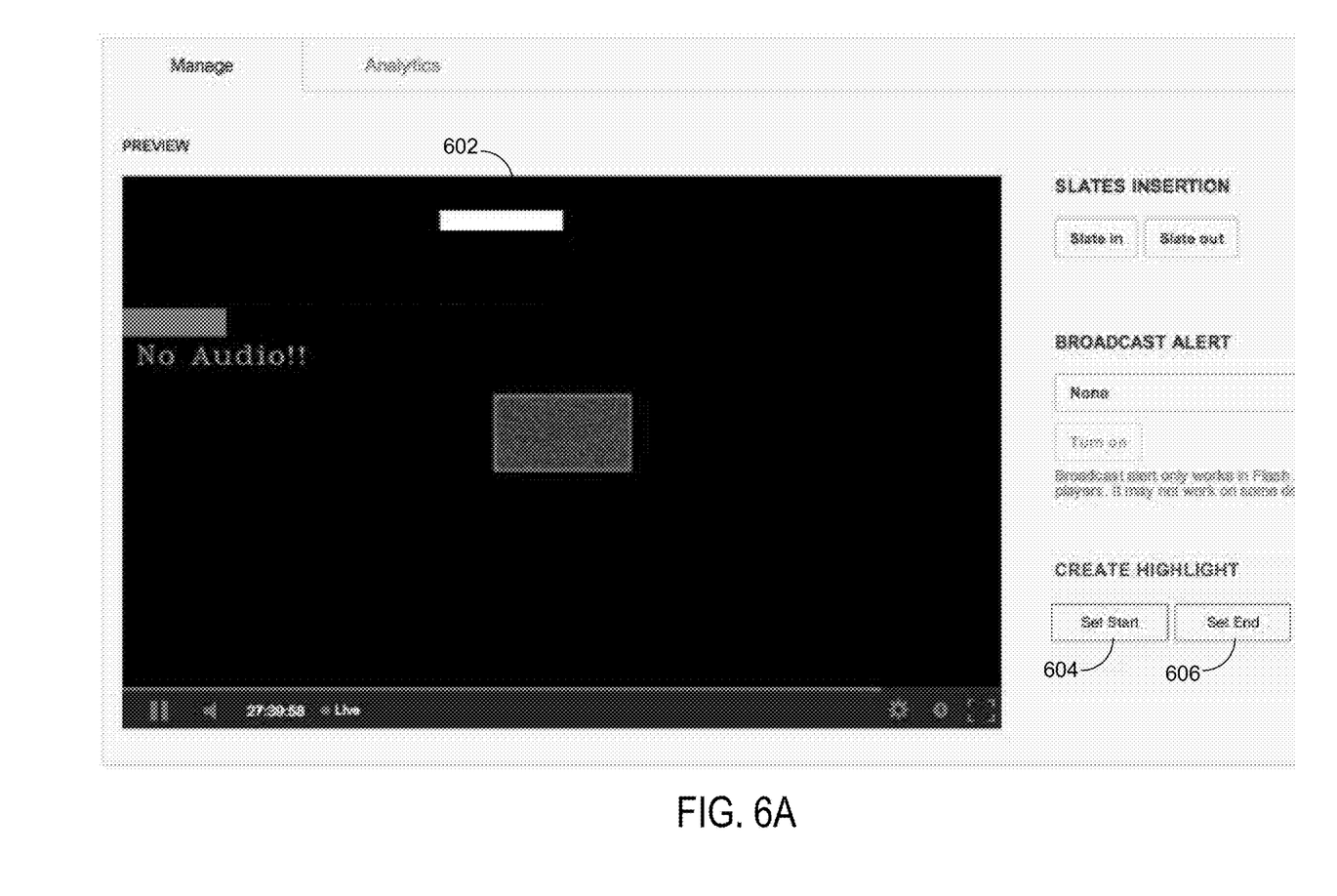
FIGS. 6A-6C are examples of a media player according to one embodiment.
Figure 6B:
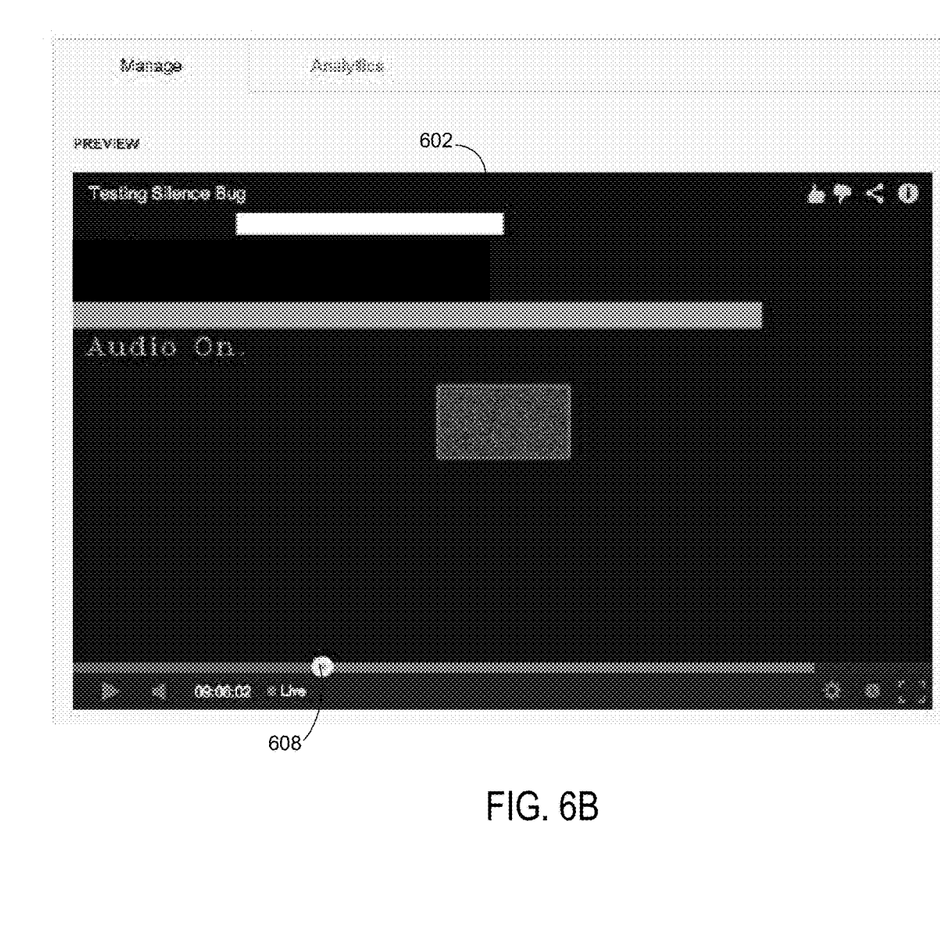
Figure 6C:
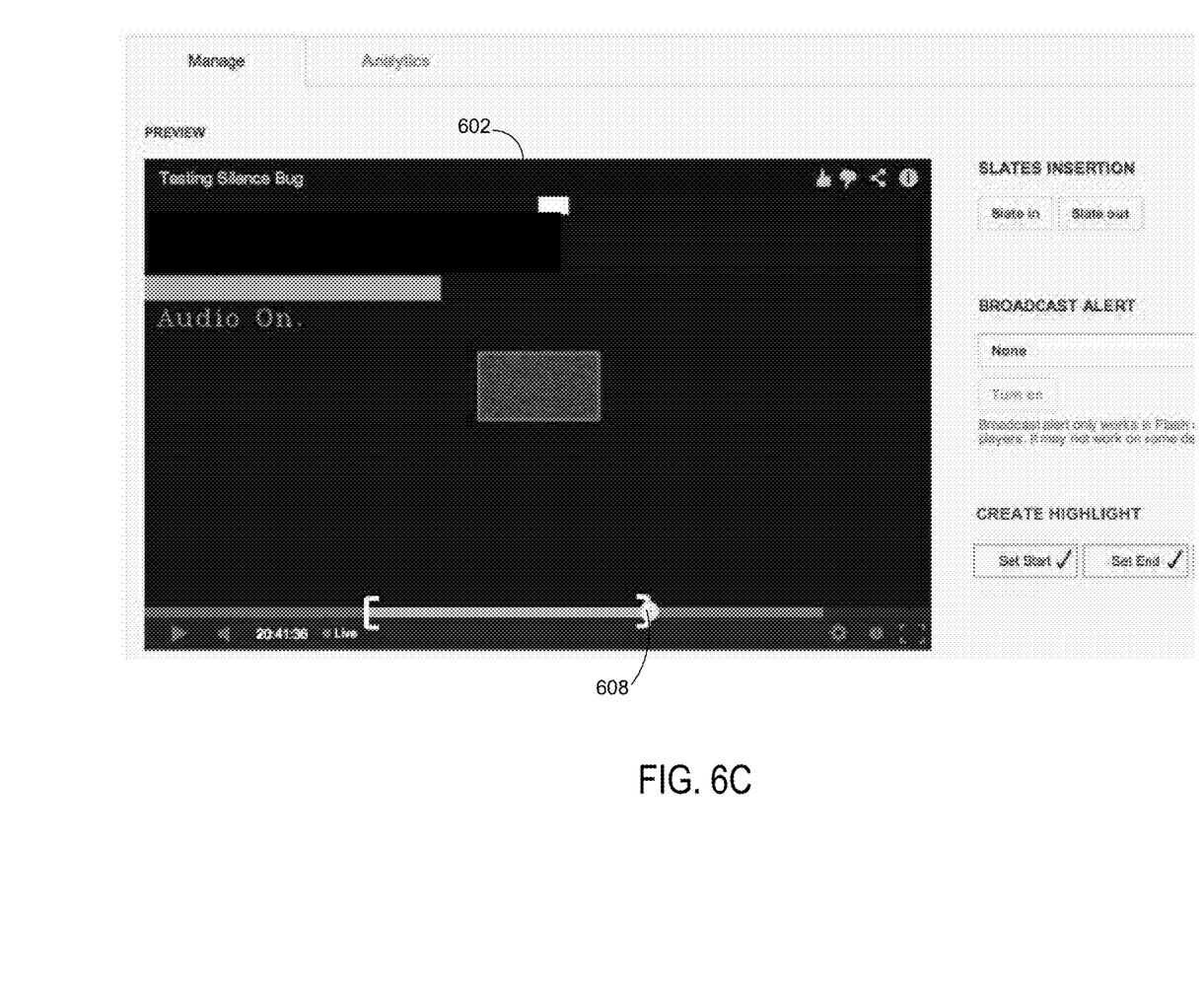

FIG. 6A illustrates an example of a media player 602 presenting a media stream. If the user wishes to create a media clip from the media stream, the user selects button 604 to set the clip start time for the clip and button 606 to set the clip end time. FIG. 6B illustrates the user seeking through the media stream using interface element 608 to select a clip start time of 9 hours, 6 minutes and 2 seconds. FIG. 6C illustrates the user seeking through the media stream using interface element 608 to select a clip end time of 20 hours, 41 minutes and 36 seconds.

Once the user selects the clip start time and the clip end time, the user device 106 determines the information to transmit to the media sharing system 102 for the clip start and end times. For the clip start time, the user device 106 determines the identifier of the media stream chunk presented at the clip start time and the offset for the chunk based on the clip start time. For the clip end time, the user device 106 determines the identifier of the media stream chunk presented at the clip end time and the offset determined based on the clip end time. The user device 106 transmits a request to the media sharing system 102 that a media clip be created from the media stream. The user device 106 also transmits the determined chunk identifier and offset for both the clip start and end times with the request.

The network 108 represents the communication pathways between the media sharing system 102, broadcaster systems 104, and user devices 106. In one embodiment, the network 108 is the Internet and uses standard communications technologies and/or protocols. Thus, the network 108 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 108 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
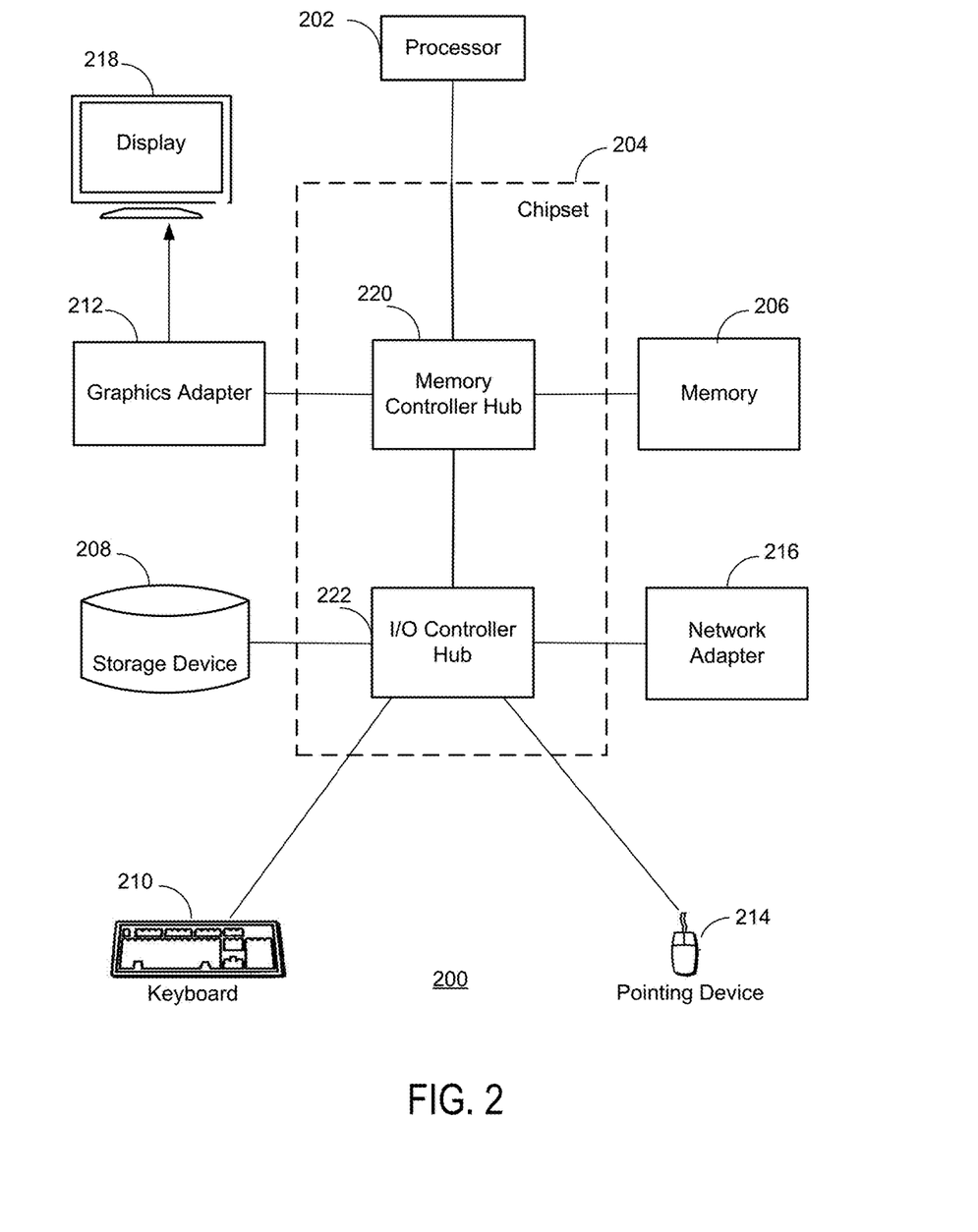
FIG. 2 is a block diagram illustrating a functional view of a typical computer system for use as one of the entities illustrated in the environment of FIG. 1 according to an embodiment.

FIG. 2 is a high-level block diagram illustrating a functional view of a typical computer system for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, a computer 200 can have different and/or other components than those shown in FIG. 2. In addition, the computer 200 can lack certain illustrated components. For example, a computer system 200 acting as a media sharing system 102 may lack a keyboard 210 and a pointing device 214. Moreover, the storage device 208 can be local and/or remote from the computer 200 (such as embodied within a storage area network (SAN)).

The computer 200 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 208, loaded into the memory 206, and executed by the processor 202.

The types of computer systems 200 used by the entities of FIG. 1 can vary depending upon the embodiment and the processing power used by the entity. For example, a user device 106 may be a mobile phone with limited processing power, a small display 218, and may lack a pointing device 214. The media sharing system 102, in contrast, may comprise multiple blade servers working together to provide the functionality described herein.

Figure 3:
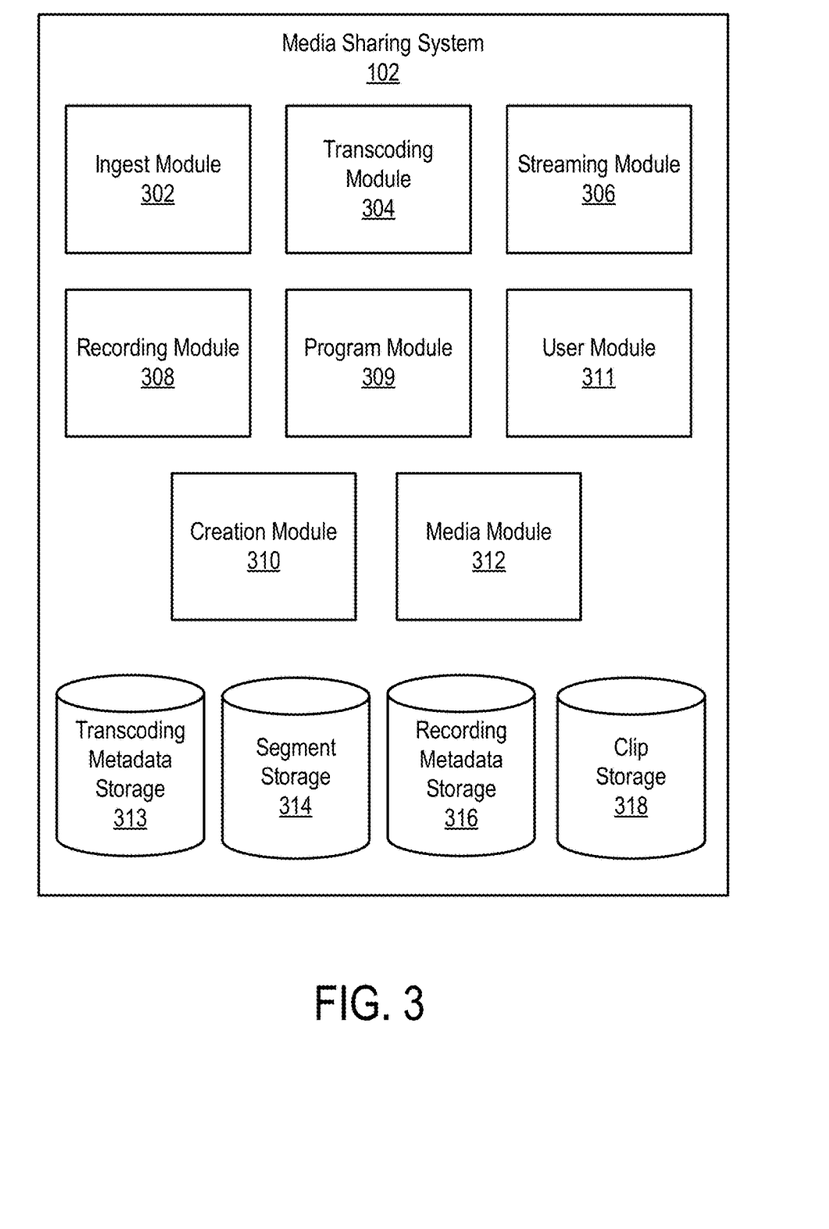
FIG. 3 is a block diagram illustrating modules operating within a media sharing system according to one embodiment.

FIG. 3 is a block diagram illustrating modules operating within a media sharing system 102 according to one embodiment. The media sharing system 102 includes an ingest module 302, a transcoding module 304, a streaming module 306, a recording module 308, a program module 309, a user module 311, a creation module 310, and a media module 312. The media sharing system 102 additionally includes a transcoding metadata storage 313, segment storage 314, a recording metadata storage 316, and a clip storage 318. Those of skill in the art will recognize that other embodiments can have different and/or other modules than the ones described here, and that the functionalities can be distributed among the modules in a different manner.

The ingest module 302 processes media streams provided by broadcaster systems 104. When the ingest module 302 receives a media streams provided by a broadcaster system 104 for sharing with users, the ingest module 302 notifies the transcoding module 304 and the recording module 308 of the receipt of the media stream. In one embodiment, prior to the ingest module 302 notifying the transcoding module 304 and the recording module 308, the ingest module 302 verifies that the media stream does not include unacceptable content, such as nudity or copyrighted content. If the media stream includes unacceptable content, the media stream is rejected.

The transcoding module 304 creates multiple versions of media streams. As a media stream is received from a broadcaster system 104, the transcoding module 304 transcodes the media stream to create multiple versions of the media stream that can be sent to a user. Each version has a different resolution quality. For example, for a received media stream, the transcoding module 304 creates different versions of the media streams, each version with one of the following resolutions qualities: 144p, 240p, 360p, 480p, 720p, and 1080p and one set each in format M2TS and format MP4 for streaming in HLS and DASH format. The transcoding module 304 also produces additional files for audio.

Each version of a media stream is comprised of multiple chunks. For example, each chunk may include 5 seconds of media stream content. Each chunk includes a group of pictures of the media stream's content. For each chunk, the transcoding module 304 assigns an identifier to the chunk. The transcoding module 304 stores the identifier of the chunk in the transcoding metadata storage 313 along with additional metadata associated with the chunk.

In one embodiment, the additional metadata includes a playback time of the chunk and a chunk start time. As described above, the playback time of a chunk indicates how far into the media stream the chunk is to be presented by a media player (i.e., after how much elapsed time of the media stream the chunk is to be presented). The chunk start time is a wall time associated with the chunk. In one embodiment, the chunk start time is the time at which the chunk's content was first received by the media sharing system 102 from a broadcaster system 104 (a time at which the chunk's content was broadcast). For example, the playback time of a chunk may be 6 minutes, 5 seconds (i.e., that the chunk should be presented 6 minutes and 5 second into the media stream) and the chunk start time maybe be 4:15 PM (i.e., that the content of the chunk was broadcast at 4:15 PM). Additional metadata that may be stored for a chunk includes a time duration of the chunk.

The streaming module 306 transmits media streams to user devices 106. When a media stream is received from a broadcaster system 104, the streaming module 306 transmits the media stream to a user device 106 of each user that requests the media stream.

For the device 106 of each requesting user of a media stream, the streaming module 306 selects a version of the media stream to provide. In one embodiment, the user indicates the version that is to be provided. In another embodiment, the streaming module 306 selects a version that has been set as a default version.

In another embodiment, the streaming module 306 selects the version to provide based one of the capabilities of the user's device 106. When a user device 106 requests the media stream, the request includes information as to the capabilities of the device 106. The request may include, for example, display capabilities of the device (e.g., type of display screen, size of screen, maximum brightness, and resolution) and network information associated with the device 106 (e.g., available bandwidth and current download speeds). Based on the information received, the streaming module 306 selects to provide the highest resolution version of the media stream that is supported by the device 106 and can adequately be presented by the device 106.

The streaming module 306 transmits the chunks of the selected media stream version to the user device 106. For each transmitted chunk, the streaming module 306 also transmits to the user device 106 the identifier of the chunk and the playback time associated with the chunk.

The recording module 308 creates media segments from received media streams. As a media segment is being received from a broadcaster system 104, the recording module 308 creates media segments that include content of the media stream. The recording module 308 creates segments of a certain size (e.g., 5 megabyte segments). As a media stream is being received, when enough content is received for a segment, the recording module 308 creates a segment. The recording module 308 continues the process as long as the media stream continues to be received.

Each created segment includes multiple chunks that are ordered according to the order in which they are presented. The chunks in a media segment are different than those of the transcoding module 304 in that media segment chunks are not transcoded. The recording module 308 stores each created segment in the segment storage 314.

For each created segment, the recording module 308 stores metadata associated with the segment in the recording metadata storage 316. The metadata includes an identifier assigned by the recording module 308 to the segment, an indicator of the media stream that the segment is from, a time duration of the segment, a segment start time, and a segment end time. The segment start and end times are wall times associated with the segment. In one embodiment, the segment start time is the wall time at which the start of the segment (the first chunk of the segment) was received by the media sharing system 102 from a broadcaster system 104 (a time at which the start of the segment was broadcast). The segment end time is the wall time at which the end of the segment (the end of the last chunk of the segment) was received by the media sharing system 102 from the broadcaster system 104 (a time at which the end of the segment was broadcast).

The metadata stored for the segment additionally includes an offset and time duration for each chunk of the segment. The offset of a segment indicates how far into the segment the chunk is presented. For example, assume that a chunk of the segment has an offset of 2 minutes. This means that presentation of the chunk begins two minutes after presentation of the segment is initiated.

The program module 309 manages the creation of media clips from media streams based on programming information of media streams. For a media stream received by the media sharing system 102, the program module 309 receives programming information associated with the media stream. As described above, programming information may include an identifier of programs included in the media stream, a description of each program, a program start time and end time of each program identified by the information. In one embodiment, the programming information of a media stream is received from the broadcaster system 104 that provided the stream to the media sharing system 102. In another embodiment, the programming information is obtained from by a third-party system (e.g., a program listing system).

In one embodiment, for each program of a media stream identified by programming information, the program module 309 determines to create a media clip for the program. For each program for which a media clip is to be created, the program module 309 determines the program start time and the program end time of the program from the programming information received for the media stream. The program module 309 instructs the creation module 310 to create a media clip for the program. The program module 309 provides the program start time as a wall start time and the program end time as a wall end time for the creation of the media clip.

The user module 311 processes requests from users to create media clips. For a user request to create a media clip from a media stream, the user module 311 receives from a user device 106 information associated with clip start time and end time set by the user for the clip. The clip start and end times are times with respect to elapsed playback of the media stream. However, the segments stored in the segment storage 314 that are used to create clips are associated with wall times (e.g., broadcast clock times). For example, a clip start time may be 6 minutes, meaning that the clip should start with content from 6 minutes into the media stream. However, the same starting content may be associated in the segment storage 314 with a wall time of 2:50 PM, which is the time at which the content was broadcast. Therefore, with the information received from the user device 106, the user module 311 maps the clip start time to a wall start time and the clip end time to a wall end time.

In one embodiment, the information received for the clip start time is an identifier of a chunk presented at the clip start time and an offset (difference between clip start time and playback time of the chunk). The user module 311 finds metadata associated with the chunk in the transcoding metadata storage 313 using the chunk identifier. Specifically, the user module 311 identifies in the storage 313 the chunk wall start time of the chunk. The user module 311 adds the received offset to the chunk start time to obtain the wall start time for the media clip.

The information received for the clip end time is an identifier of a chunk presented at the clip end time and an offset (difference between clip end time and playback time of the chunk). The user module 311 uses the chunk identifier to identify in the storage 313 the chunk wall start time of the chunk. The user module 311 adds the received offset to the chunk start time to obtain the wall end time for the media clip.

The user module 311 instructs the creation module 310 to create the media clip. The user module 311 provides the creation module 310 the determined wall start time and wall end time for the media clip.

The creation module 310 creates media clips from media streams. The creation module 310 receives requests from the program module 309 and the user module 311 to create media clips from media streams. For a request to create a media clip from a media stream, the creation module 310 receives a wall start time and a wall end time for the media clip. The creation module 310 searches the recording metadata storage 316 to identify media segments of the media stream that have a segment start time and/or a segment end time within the received wall start time and the received wall end time. Hence, the creation module 310 is identifying segments that include desired content for the media clip. For example, if the received wall start time is 4:00:00 PM and the received wall end time is 4:29:59 PM, the creation module 310 identifies segments with start and/or end times within 4:00:00 PM and 4:29:59 PM.

The creation module 310 determines which content of the identified segments to use in creating the media clip. If a segment's start time and end time is within the received start time and end time, the creation module 310 determines to use the entire content of the segment for clip creation because the entire segment includes content needed for the clip.

However, if either the segment start time or end time of an identified segment is not within the received start and end time (segment includes content that is not to be included in the media clip), the creation module 310 selects chunks of the segment to use for the media clip. If the start time of a segment is not within the received start and end times, the creation module 310 selects the chunks of the segment to use by identifying the first chunk in the segment that includes content needed for the media clip. For example, if the media clip is for a program, the creation module 310 identifies the first chunk in the segment that includes program content. The creation module 310 selects the identified first chunk and each of the subsequent chunks of the segment for the media clip.

The creation module 310 uses the offset and duration information stored in the recording metadata storage 316 for chunks of the segment to identify the first chunk that includes content needed for the media clip. Specifically, the creation module 310 identifies the first chunk to be when the received start time is within the segment start time plus the chunk offset and the segment start time plus the segment offset and duration. Continuing with the example from above where the received start time is 4:00:00 PM and end time is 4:29:59 PM, assume that a segment includes content of the media stream between 3:58:00 PM and 4:01:59 PM. Further assume that the segment includes four chunks (chunks #1, #2, #3, and #4), each with a 59 second duration and chunk #3 has a 2 minute offset. Based on this information, the creation module 310 would determine that chunk #3 is the first chunk that includes content needed for the media clip since it starts at 4:00:00 PM. Therefore, the creation module 310 would select chunks #3, as well as chunk #4 since it also includes content needed for the media clip.

If the end time of a segment is not within the received start and end times, the creation module 310 selects the chunks of the segment to use by identifying the last chunk in the segment that includes needed for the media clip. The creation module 310 selects the identified last chunk and each of the preceding chunks of the segment for the media clip. Offset and duration information of the segment chunks is used to identify the last chunk that includes content needed for the media clip. The creation module 310 identifies the last chunk to be when the received end time is within the segment start time plus the chunk offset and the segment start time plus the segment offset and duration.

Continuing with the example from above where the received start time is 4:00:00 PM and the end time is 4:29:59 PM, assume that a segment includes content of the media stream between 4:28:00 PM and 4:31:59 PM. Further assume that the segment includes four chunks (chunks #1, #2, #3, and #4), each with a 59 second duration and chunk #2 has a 1 minute offset. Based on this information, the creation module 310 would determine that chunk #2 is the last chunk of the segment that includes content needed for the media stream since it ends at 4:29:59 PM. Therefore, chunks #1 and #2 are selected for the media clip.

The creation module 310 creates the requested media clip to include the identified content. The creation module 310 stores the created media clip in the clip storage 318. If the media clip is for a program, the creation module 310 stores information with the media clip identifying the program. If the media clip was created based on a user's request, the creation module 310 stores information with the media clip identifying user.

In another embodiment, instead of creating a single media clip from the identified content, the creation module 310 creates multiple media clips. To create the multiple clips, the creation module 310 divides the identified content into a set number of content portions (e.g., into three portions). For each content portion, the creation module 310 creates a media clip that includes the content of the portion.

The media module 312 processes requests from user devices 106 for media clips. Upon request, the media module 312 provides to a user device 106 an interface through which users can search for and request specific media clips made available by the media sharing system 102 for access. When a request is received from a user device 106 for a specific media clip, the media module 312 searches the clip storage 318 for the clip. The media module 312 transmits (e.g., streams) the requested media clip to the user device 106. The media clip is presented by a media player loaded on the user device 106. In one embodiment, if a media clip is associated with a user (e.g., created based on a request from the user), the media module 312 only allows the user to access the media clip. In one embodiment, the user can provide other users with permission to access the media clip.

Figure 4:
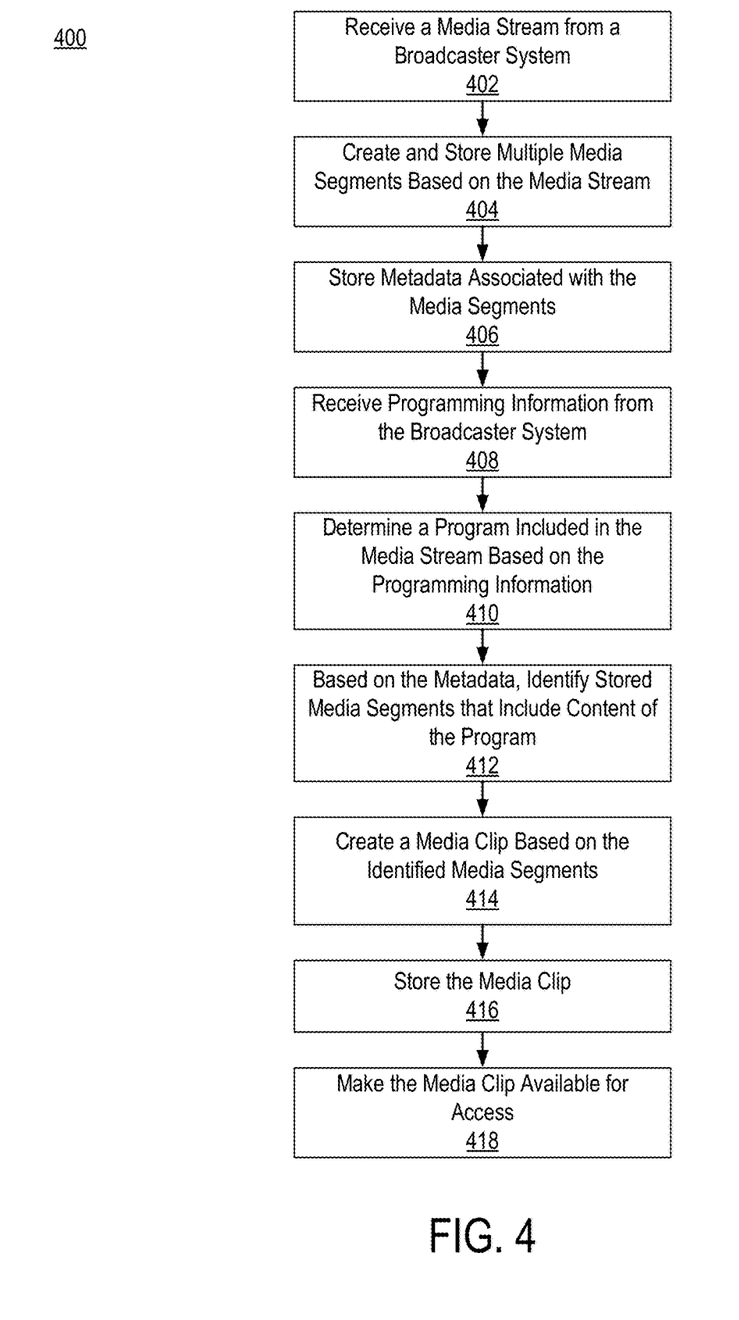
FIG. 4 is a flow chart illustrating operations of the media sharing system in creating a media clip based on programming information according to one embodiment.

FIG. 4 is a flow chart 400 illustrating operations of the media sharing system 102 in creating a media clip based on programming information according to one embodiment. Those of skill in the art will recognize that other embodiments can perform the steps of FIG. 4 in different orders. Moreover, other embodiments can include different and/or additional steps than the ones described herein.

The media sharing system 102 receives 402 a media stream from a broadcaster system 104. The media sharing system 102 creates 404 and stores multiple media segments based on the media stream. Each media segment includes content of the media stream. The media sharing system 102 stores 406 metadata associated with the media segments. The metadata stored for a media segment includes a segment start time and segment end time.

The media sharing system 102 also receives 408 from the broadcaster system 104 programming information describing programming of the media stream. Based on the programming information, the media sharing system 102 determines 410 a program included in the media stream. The media sharing system 102 identifies 412 stored media segments that include content of the program. The media segments are identified based on the stored metadata and a program start time and end time of the program.

The media sharing system 102 creates 414 a media clip based on content included in the identified media segments. The media sharing system 102 stores 416 the media clip and makes 418 the media clip available for access by users.

Figure 5:
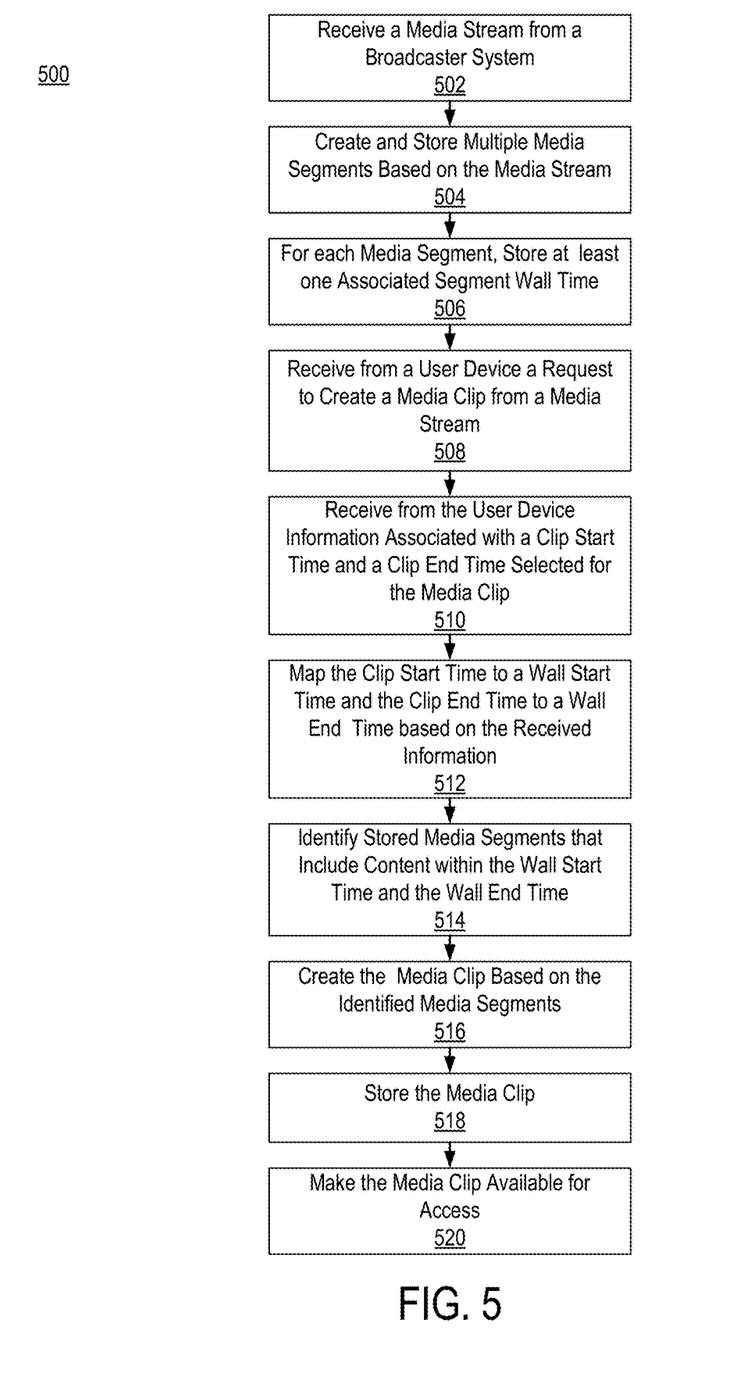
FIG. 5 is a flow chart illustrating operations of the media sharing system in creating a media clip based on a user request according to one embodiment.

FIG. 5 is a flow chart 500 illustrating operations of the media sharing system 102 in creating a media clip based on a user request according to one embodiment. Those of skill in the art will recognize that other embodiments can perform the steps of FIG. 5 in different orders. Moreover, other embodiments can include different and/or additional steps than the ones described herein.

The media sharing system 102 receives 502 a media stream from a broadcaster system 104. The media sharing system 102 creates 504 and stores multiple media segments based on the media stream. For each media segment, the media sharing system 102 stores 506 at least one wall time associated with the media segment. In one embodiment, the media sharing system 102 stores a segment start time and a segment end time for each media segment.

The media sharing system 102 receives 508 from a user device 106 a request for a media clip to be created from the media stream. The media sharing system 102 also receives 510 information associated with a clip start time and a clip end time selected by the user for the media clip. In one embodiment, the information received for the clip start time is an identifier of a chunk of the media stream presented at the clip start time and an offset indicating a position of the clip start time within the chunk. The information received for the clip end time is an identifier of a chunk of the media stream presented at the clip end time and an offset indicating a position of the clip end time within the chunk. In one embodiment, the information received also includes the clip start and end times.

The media sharing system 102 maps 512 the clip start time to a wall start time and the clip end time to a wall end time based on the received information. The media sharing system 102 identifies 514 stored media segments that include content of the media stream within the wall start time and wall end time. The media sharing system 102 creates 516 the media clip based on content included in the identified media segments. The media sharing system 102 stores 518 the media clip and makes 520 the media clip available for access by the user.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

The invention claimed is:

1. A computer-implemented method comprising:
receiving, by a media sharing system from an additional system, a media stream;
transcoding, by the media sharing system, the media stream into a transcoded media stream, the transcoded media stream including a plurality of transcoded chunks, the plurality of transcoded chunks being sequential and each respective transcoded chunk having a respective transcoded chunk identifier that identifies the respective transcoded chunk and a transcoded chunk start time, wherein each respective transcoded chunk start time is relative to a start of the transcoded media stream;
streaming, by the media sharing system, the transcoded media stream to a user device;
creating, by the media sharing system, a plurality of media segments that include content of the received media stream, each media segment of the plurality of media segments being associated with at least one wall time that defines a real time at which the media segment was received from the additional system and being comprised of a plurality of media stream chunks, each respective media stream chunk having a respective media stream chunk identifier and a respective media stream chunk wall start time;
receiving, by the media sharing system from the user device, a request to create a media clip from the media stream based on a user of the user device selecting a clip start time and a clip end time for the media clip in an interface presented by the user device, the clip start time indicating a first transcoded chunk identifier that identifies a first transcoded chunk from the plurality of transcoded chunks and a first transcoded chunk offset within the first transcoded chunk and the clip end time indicating a second transcoded chunk identifier that identifies a second transcoded chunk from the plurality of transcoded chunks and a second transcoded chunk offset within the second transcoded chunk;
determining, by the media sharing system, a clip wall start time corresponding to the clip start time based on the first transcoded chunk identifier and the first transcoded chunk offset;
determining, by the media sharing system, a clip wall end time corresponding to the clip end time based on the second transcoded chunk identifier and the second transcoded chunk offset;
identifying, by the media sharing system from the plurality of media segments, one or more media segments that include content beginning at the clip wall start time and ending at the clip wall end time; and
creating, by the media sharing system, the media clip based on content included in the identified media segments.

2. The method of claim 1, wherein determining the clip wall start time comprises:
identifying a first transcoded chunk wall start time associated with the first transcoded chunk based on the first transcoded chunk identifier; and
adding the first transcoded chunk offset to the first transcoded chunk wall start time.

3. The method of claim 2, wherein the first transcoded chunk offset is a difference between the clip start time selected by the user for the media clip and the transcoded chunk start time of the first transcoded chunk.

4. The method of claim 1, wherein determining the clip wall end time comprises:
identifying a second transcoded chunk wall start time associated with the second transcoded chunk based on the second transcoded chunk identifier; and
adding the second transcoded chunk offset to the second transcoded chunk wall start time.

5. The method of claim 4, wherein the seconded transcoded chunk offset is a difference between the clip end time selected by the user for the media clip and the transcoded chunk start time of the second transcoded chunk.

6. The method of claim 1, wherein responsive to an identified segment having a segment start time and a segment end time within the wall start time and the wall end time, determining to include the entire content of the segment in the media clip.

7. The method of claim 1, wherein an identified segment includes a plurality of media stream chunks and responsive to an identified segment having a segment start time or a segment end time that is not within the wall start time and the wall end time, determining a subset of the plurality of media stream chunks of the identified segment to include in the media clip.

8. The method of claim 1, further comprising:
responsive to receiving a request for the media clip from the user device, transmitting the media clip to the user device.

9. A media sharing system including one or more processors that execute computer readable instructions that when executed by the one or more processors cause the one or more processors to:
receive a media stream from an additional system;
transcode the media stream into a transcoded media stream, the transcoded media stream including a plurality of transcoded chunks, the plurality of transcoded chunks being sequential and each respective transcoded chunk having a respective transcoded chunk identifier that identifies the respective transcoded chunk and a transcoded chunk start time, wherein each respective transcoded chunk start time is relative to a start of the transcoded media stream;

stream the transcoded media stream to a user device;

create a plurality of media segments that include content of the received media stream, each media segment of the plurality of media segments being associated with at least one wall time that defines a real time at which the media segment was received from the additional system and being comprised of a plurality of media stream chunks, each respective media stream chunk having a respective media stream chunk identifier and a respective media stream chunk wall start time;

receive, from the user device, a request to create a media clip from the media stream based on a user of the user device selecting a clip start time and a clip end time for the media clip in an interface presented by the user device, the clip start time indicating a first transcoded chunk identifier that identifies a first transcoded chunk from the plurality of transcoded chunks and a first transcoded chunk offset within the first transcoded chunk and the clip end time indicating a second transcoded chunk identifier that identifies a second transcoded chunk from the plurality of transcoded chunks and a second transcoded chunk offset within the second transcoded chunk;

determine a clip wall start time corresponding to the clip start time based on the first transcoded chunk identifier and the first transcoded chunk offset;

determine a clip wall end time corresponding to the clip end time based on the second transcoded chunk identifier and the second transcoded chunk offset;

identify one or more media segments that include content beginning at the clip wall start time and ending at the clip wall end time; and create the media clip based on content included in the identified media segments.

10. The media sharing system of claim 9, wherein determining the clip wall start time comprises:

identifying a first transcoded chunk wall start time associated with the first transcoded chunk based on the first transcoded chunk identifier; and adding the first transcoded chunk offset to the first transcoded chunk wall start time.

11. The media sharing system of claim 10, wherein the first transcoded chunk offset is a difference between the clip start time selected by the user for the media clip and the transcoded chunk start time of the first transcoded chunk.

12. The media sharing system of claim 9, wherein determining the clip wall end time comprises:

identifying a second transcoded chunk wall start time associated with the second transcoded chunk based on the second transcoded chunk identifier; and adding the second transcoded chunk offset to the second chunk wall start time.

13. The media sharing system of claim 12, wherein the seconded transcoded chunk offset is a difference between the clip end time selected by the user for the media clip and the transcoded chunk start time of the second transcoded chunk.

14. The media sharing system of claim 9, wherein the computer readable instructions further cause the one or more processors to:

responsive to an identified segment having a segment start time and a segment end time within the wall start time and the wall end time, determine to include the entire content of the segment in the media clip.

15. The media sharing system of claim 9, wherein:

an identified segment includes a plurality of media stream chunks and responsive to an identified segment having a segment start time or a segment end time that is not within the wall start time and the wall end time, the computer readable instructions further cause the one or more processors to determine a subset of the plurality of media stream chunks of the identified segment to include in the media clip.

16. The media sharing system of claim 9, wherein the computer readable instructions further cause the one or more processors to:

responsive to receiving a request for the media clip from the user device, transmit the media clip to the user device.

* * * * *